(12) United States Patent
Jaljal

(10) Patent No.: US 12,143,044 B2
(45) Date of Patent: Nov. 12, 2024

(54) DEVICE AND METHOD FOR STOPPING AN ELECTRIC MACHINE FOR A TURBINE ENGINE

(71) Applicant: SAFRAN, Paris (FR)

(72) Inventor: Nawal Jaljal, Moissy-Cramayel (FR)

(73) Assignee: SAFRAN, Paris (FR)

( * ) Notice: Subject to any disclaimer, the term of this patent is extended or adjusted under 35 U.S.C. 154(b) by 156 days.

(21) Appl. No.: 17/798,340

(22) PCT Filed: Feb. 2, 2021

(86) PCT No.: PCT/FR2021/050186
§ 371 (c)(1),
(2) Date: Aug. 9, 2022

(87) PCT Pub. No.: WO2021/160952
PCT Pub. Date: Aug. 19, 2021

(65) Prior Publication Data
US 2023/0048426 A1 Feb. 16, 2023

(30) Foreign Application Priority Data
Feb. 10, 2020 (FR) .................................. 2001300

(51) Int. Cl.
*F02K 5/00* (2006.01)
*F02C 6/08* (2006.01)
(Continued)

(52) U.S. Cl.
CPC .............. *H02P 29/024* (2013.01); *F02C 6/08* (2013.01); *F02C 7/25* (2013.01); *F02C 7/32* (2013.01);
(Continued)

(58) Field of Classification Search
CPC .. H02K 21/14; H02K 9/19; F02K 5/00; F02C 7/32; F02C 7/25; F02C 6/08; H02P 29/024; F05D 2220/768; F05D 2270/09
(Continued)

(56) References Cited

U.S. PATENT DOCUMENTS

2008/0245051 A1* 10/2008 Skelton ................. F01D 25/125
60/39.83
2011/0030331 A1* 2/2011 Tong ..................... F01N 3/2066
60/39.5

(Continued)

FOREIGN PATENT DOCUMENTS

| EP | 3618263 A1 | 3/2020 |
|---|---|---|
| FR | 3079361 A1 | 9/2019 |
| JP | 2019-037096 A | 3/2019 |

OTHER PUBLICATIONS

International Search Report in PCT/FR2021/050186, dated Apr. 21, 2021 (6 pages).
(Continued)

*Primary Examiner* — Gabriel Agared
(74) *Attorney, Agent, or Firm* — Bookoff McAndrews, PLLC

(57) ABSTRACT

An electrical assembly for an aeronautical turbomachine, including an electric machine configured to be disposed in a turbomachine and comprising a stator and a rotor comprising magnets, the assembly including a short-circuit detecting means, a hot air injecting means configured to draw hot air off the turbomachine at a temperature greater than the temperature of demagnetization of the magnets of the rotor, and to inject the drawn hot air onto the magnets of said rotor when the short-circuit detecting means detects the presence of a short-circuit in the electric machine, and a cool air injecting means, configured to draw cool air off the turbomachine and to inject it into an inner chamber of the
(Continued)

turbomachine, the temperature of the cool air drawn by the cool air injecting means being less than the temperature of the hot air drawn by the hot air injecting means.

13 Claims, 3 Drawing Sheets

(51) Int. Cl.
  *F02C 7/25* (2006.01)
  *F02C 7/32* (2006.01)
  *H02K 9/19* (2006.01)
  *H02K 21/14* (2006.01)
  *H02P 29/024* (2016.01)
(52) U.S. Cl.
  CPC ............... *H02K 9/19* (2013.01); *H02K 21/14* (2013.01); *F05D 2270/09* (2013.01)

(58) Field of Classification Search
  USPC .................................................... 318/400.21
  See application file for complete search history.

(56) References Cited

U.S. PATENT DOCUMENTS

| | | | |
|---|---|---|---|
| 2019/0097479 A1 | 3/2019 | Chong et al. | |
| 2020/0011247 A1* | 1/2020 | Schwarz | F02C 7/185 |
| 2020/0067383 A1* | 2/2020 | Hon | F01D 15/10 |
| 2020/0347782 A1* | 11/2020 | Medda | B64D 15/04 |

OTHER PUBLICATIONS

French Search Report in French patent application FR 2001300, dated Oct. 15, 2020 (2 pages).

* cited by examiner

[Fig. 1]
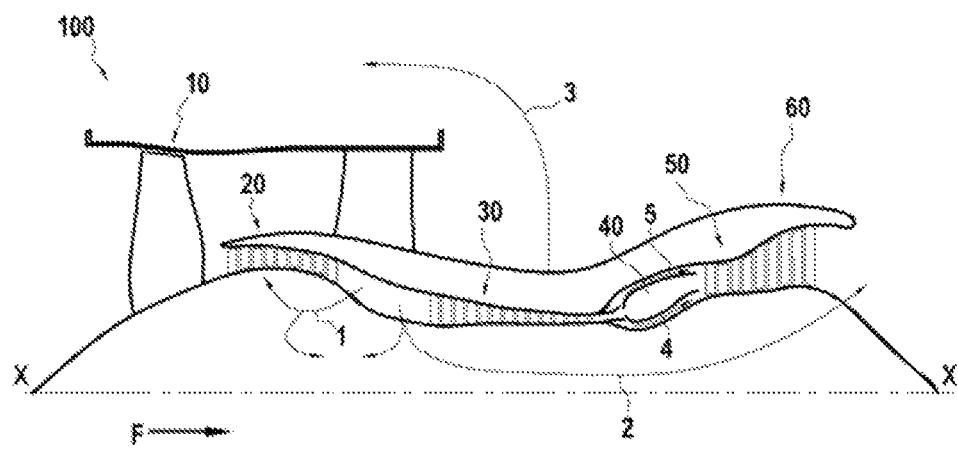
[Fig. 2]
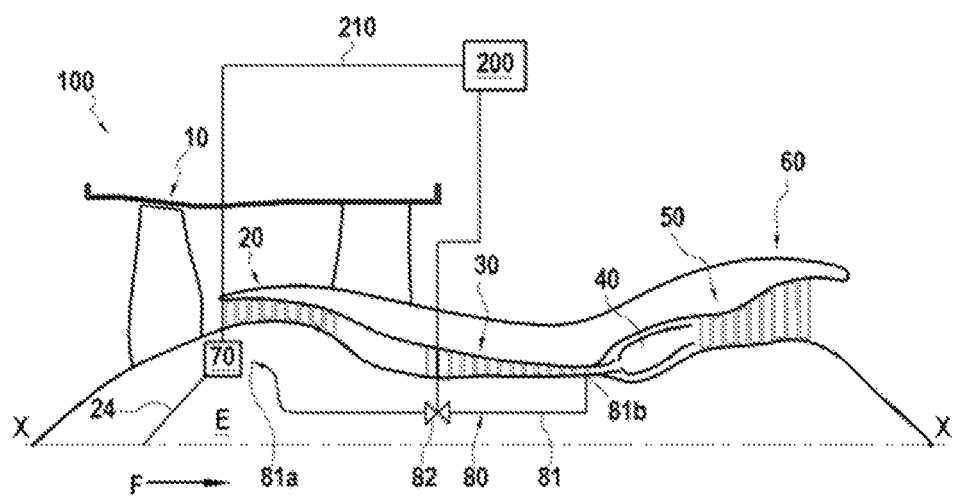

[Fig. 3]
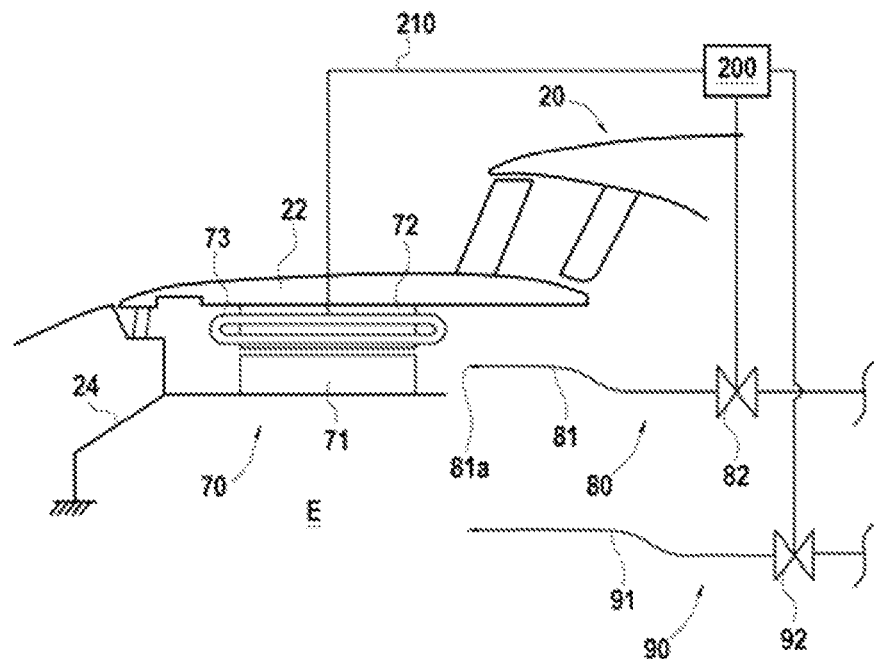
[Fig. 4]
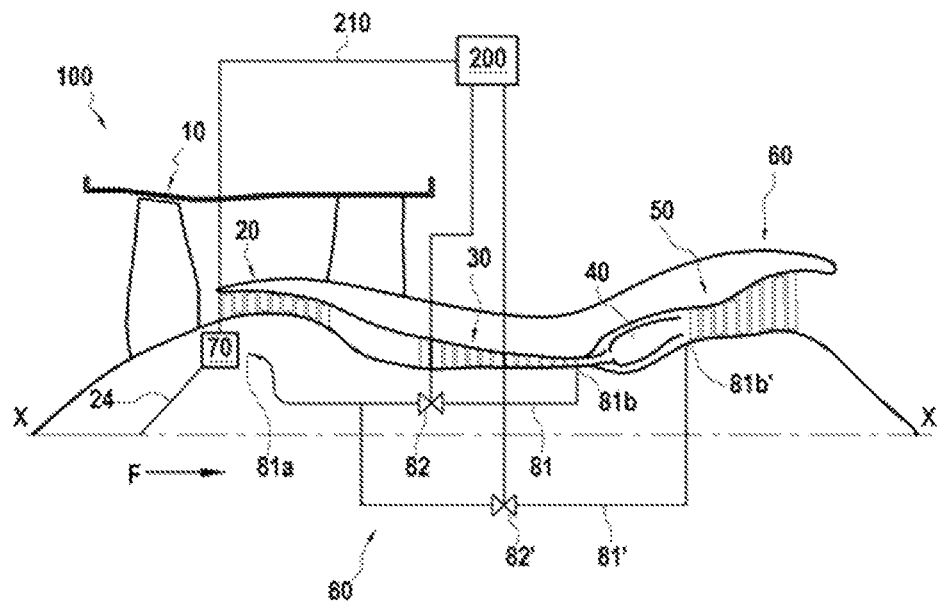

[Fig. 5]
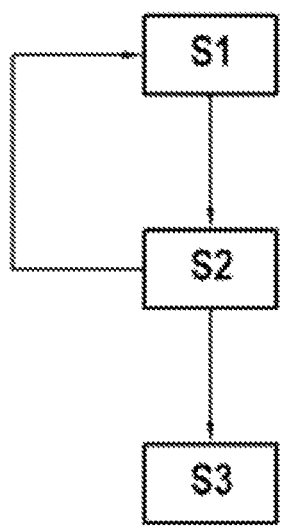

DEVICE AND METHOD FOR STOPPING AN ELECTRIC MACHINE FOR A TURBINE ENGINE

CROSS-REFERENCE TO RELATED APPLICATION(S)

This patent application is the U.S. National Stage entry under 35 U.S.C. § 371 of International Patent Application No. PCT/FR2021/050186, filed on Feb. 2, 2021, which claims the benefit of priority to French Patent Application No. 2001300, filed on Feb. 10, 2020.

TECHNICAL FIELD

The invention relates to the field of turbomachines. More precisely, the invention relates to a device for stopping an electric machine of an aircraft turbomachine, in the event of a short-circuit, and a method using such a device.

PRIOR ART

The use of synchronous electrical machines with permanent magnets is known, particularly for aeronautical turbomachines. These electrical machines can be connected to one or more shafts of the turbomachine.

Permanent-magnet synchronous machines, so-called "PMSM", represent an advantageous technology in terms of efficiency, mass density and dynamic torque. These criteria are essential to allow a performance gain with the electrification of the turbomachine.

These machines do however present a considerable challenge in terms of safety, in particular due to the risk of setting up a short circuit and starting a fire. The appearance of a short-circuit in the windings of the electric machine can be a consequence of the deterioration of the insulant due to the conditions of use or ageing, particularly high temperatures and/or overvoltages. The deterioration of the insulant combined with high altitudes involves the appearance of partial discharges which further damage the insulant. An electrical arc can be created with a plasma leading to the deposition of material and the appearance of a short-circuit. The very high currents can also cause fires to break out.

Furthermore, PMSMs cannot be de-energized as long as the magnets of the electric machine, by rotating, continue to generate a magnetic field which supplies the short-circuit. However, the rotor of the electric machine which contains the magnets is generally coupled to the shaft of the turbomachine, making it difficult to stop the short-circuit.

Devices such as mechanical decoupling exist for protecting against short-circuits in PMSMs, but are often not very reliable and relatively expensive, and are bulky. On a system of dog-clutch type for example, the electric machine must be set to zero torque or very low torque to be able to decouple, which is difficult to achieve in the event of a short-circuit. A fuse of mechanical type making it possible to break the mechanical connection above a certain torque can also be used. It is however necessary for the short-circuit torque to be much greater than the maximum torque to break the connection. This system is expensive and not very reliable.

There is therefore a need for a device making it possible to stop the electric machine for a turbomachine in the event of a short-circuit, both effective and of small bulk, while ensuring the temperature resistance of the equipment of the turbomachine.

PRESENTATION OF THE INVENTION

This presentation relates to an electrical assembly for an aeronautical turbomachine, comprising an electric machine configured to be disposed in a turbomachine and comprising a stator and a rotor, the rotor being configured to be rotationally secured to a shaft of the turbomachine, and comprising magnets, a short-circuit detector configured to detect the presence of a short-circuit in the electric machine, a hot air injector configured to draw hot air off the turbomachine at a temperature greater than the temperature of demagnetization of the magnets of the rotor, and to inject the drawn hot air onto the magnets of said rotor when the short-circuit detector detects the presence of a short-circuit in the electric machine, and a cool air injector, configured to draw cool air off the turbomachine and to inject it into an inner chamber of the turbomachine when the short-circuit detector detects the presence of a short-circuit in the electric machine, the temperature of the cool air drawn by the cool air injector being less than the temperature of the hot air drawn by the hot air injector.

The turbomachine comprises one or more rotating shafts. The electric machine can be disposed at different places in the turbomachine, by being secured to a rotating part mechanically coupled to one of the shafts. For example, the rotor can be mounted directly around the shaft or coupled to a module of the rotating turbomachine (compressors, turbines, reduction gear). The stator can be attached to a fixed casing of the turbomachine, and the rotor is rotationally secured to a shaft of the turbomachine, for example the low-pressure shaft or the high-pressure shaft. The windings in the stator and the permanent magnets in the rotor create an electric current when the rotor rotates. This generated electric current can in particular be used to supply a power electronics unit installed in the turbomachine. The reverse effect, i.e. the introduction of a mechanical torque on the shaft, can also be sought.

The hot air injecting means, in particular a hot air injector, makes it possible to stop this machine as soon as a short-circuit is detected, by way of the short-circuit detector. More precisely, as soon as a short-circuit is detected, the hot air injecting means immediately injects hot air onto the magnets. The stopping time of the electric machine, following the injection of hot air is less than 30 seconds, preferably less than 20 seconds, still preferably less than 10 seconds.

The hot air injecting means may in particular comprise at least one duct, a first end of which is disposed in the turbomachine, in the place where the air is drawn off, and a second end disposed near the rotor. The term "near" should be understood to mean that the second end is near enough to the rotor for the heat transfer to be as efficient as possible. In particular, the second end is near enough to the magnets of the rotor for the air temperature at the outlet of the second end to be substantially equal to the air temperature affecting the rotor, in particular the magnets of the rotor. A maximum distance between the second end and the rotor, and in particular the magnets of the rotor, is for example less than 1 cm.

Preferably, the drawing of the hot air by the hot air injecting means is done by way of the secondary air drawing system (so-called SAS for Secondary Air System) already installed in the turbomachine, and/or by adding an additional draw at a different stage of the turbomachine. More precisely, in the case of a bypass turbomachine, a primary flow and a secondary flow extend from upstream to downstream of the turbomachine, through the different stages thereof, in particular the low-pressure and high-pressure compressors, the combustion chamber, and the high- and low-pressure turbines. The draw of hot air by the injecting means can be done off one or the other, or even several of these stages. The choice of the hot air drawing site can be made according to the type of electric machine used, in particular as a function of the temperature of demagnetization of the magnets of the rotor, or Curie temperature of the material of which the magnets consist. In other words, it is the temperature above which the magnets lose their ferromagnetic properties. The term "hot air" should therefore be understood to mean air at a temperature greater than the Curie temperature of the magnets.

The fact of drawing hot air off the first end of the duct of the injecting means, routing it by way of the duct all the way to the second end to inject it, if a short-circuit is detected by the short-circuit detector, onto the magnets of the rotor, thus makes it possible to demagnetize the latter, and consequently to de-energize the electric machine, thus limiting the risk of a fire breaking out.

The drawing of cool air by the cool air injector can be done by way of the secondary air system, the so-called SAS already installed in the turbomachine.

Furthermore, the inner chamber can be a chamber located in the turbomachine, and needing to be kept at low temperature, the electric machine being able to be disposed inside this chamber, or outside, but near to it, particularly adjacent to it. On initiation of the process for stopping the machine in the event of a short-circuit, by heating the magnets, the supply of hot air increases the temperature, increasing the risk of overheating inside the inner chamber. The supply of cool air inside it makes it possible to prevent this overheat. The flow rate and temperature of the cool air drawn is preferably determined as a function of the chamber architecture and the disposition of the electric machine with respect to the latter. Preferably, the temperature of the cool air drawn by the cool air injector is far less than the temperature of the hot air drawn by the hot air injector, for example twice as low. The temperature of the cool air can be between −55° C. and 150° C.

Moreover, the fact of using the hot air and cool air drawn directly off the turbomachine, in particular using the secondary air system already present in the turbomachine, makes it possible to limit the bulk and cost of the device for stopping the electric machine. It is moreover not necessary to incorporate an additional device within the turbomachine, used to route the hot air and the cool air, such an additional device being able to provide uncontrolled problems, and being able to increase the risk of malfunctions in the turbomachine. A direct draw off the turbomachine thus makes it possible to improve the reliability of the device.

In certain embodiments, the temperature of the hot air drawn by the hot air injector is greater than 250° C., and preferably greater than 400° C.

This temperature makes it possible, if a short-circuit is detected, to demagnetize the rotor, de-energize the electric machine, and thus prevent fire breaking out.

In certain embodiments, the hot air injector is configured to draw hot air off the high-pressure compressor of the turbomachine.

Drawing off the high-pressure compressor makes it possible to obtain higher air temperatures in the turbomachine before combustion.

In certain embodiments, the hot air injector is configured to draw hot air downstream of the combustion chamber of said turbomachine.

Drawing downstream of the combustion chamber makes it possible to obtain hot air at even higher temperatures, for example 1000° C., and thus demagnetize magnets having particularly high Curie temperatures.

In certain embodiments, the hot air injector is configured to draw the hot air off the high-pressure compressor off the turbomachine and downstream of the combustion chamber of said turbomachine.

Mixing hot air drawn upstream of the combustion chamber, particularly in the high-pressure compressor, and downstream of the combustion chamber, makes it possible to control the temperature level of the air injected at the magnets. This allows for greater flexibility of temperature adjustment, and adaptation of the system to the electric machine used and the properties of the magnets it includes.

In certain embodiments, the short-circuit detector comprises temperature measurer affixed to the machine and/or measuring and impedance comparator and/or leakage current measurer.

Preferably, the temperature measuring means are thermocouples attached to the stator. A threshold temperature, characteristic of a malfunction (which may be a short-circuit), can be determined beforehand, particularly on the basis of the type of electric machine under consideration. Thus, if this given threshold value if exceeded, for example by comparing this threshold value to the temperatures read by the thermocouples, hot air can be injected onto the magnets of the rotor, by the hot air injector.

Preferably, the measuring and impedance comparator, and the leakage current measurer, are disposed in the monitoring and control unit of the electric machine which is generally incorporated into the power electronics unit of the electric machine. Similarly, threshold values or nominal values can be determined beforehand to allow for comparison and monitoring. Thus, if one or more of these given threshold values is exceeded, hot air can be injected onto the magnets of the rotor via the hot air injector. The use of these means has the advantage of being simple to implement and incorporate, and inexpensive.

In certain embodiments, the hot air injector comprises at least one valve movable between a closed position preventing the injection of hot air onto the magnets of the rotor, and an open position allowing the injection of hot air onto the magnets of the rotor.

The valve makes it possible to inject hot air onto the magnets only if a short-circuit is detected. In particular, the closed position of the valve makes it possible to maintain the temperature level of the magnets at low enough values (the operating limit can vary between 8° and 350° C.) to avoid the demagnetization of these magnets and avoid affecting their performance, when this demagnetization is not desired. In particular, under nominal operation, the temperature of the magnets must of course remain below the limit value specified by the manufacturer (a value which is less than the Curie temperature, strictly speaking), above which irreversible demagnetizations occur. The use of such a valve has the advantage of being simple and inexpensive.

In certain embodiments, the electrical assembly comprises a control unit, the short-circuit detector and the valve being connected to the control unit, the control unit being configured to open the valve when the short-circuit detector detects the presence of a short-circuit in the electric machine.

The control unit can be of ECU (Electronic Control Unit) type. Such a control unit in particular makes it possible to automate the injection of hot air onto the rotor, if a short-circuit is detected by the detector. This improves the efficiency of the device.

In certain embodiments, the hot air injector comprises an air circuit disposed in the stator of the machine and comprising a plurality of channels configured to inject hot air onto the magnets of the rotor.

This improves the efficiency of the device, by injecting hot air as closed as possible to the magnets of the rotor.

In certain embodiments, the electric machine is configured to be disposed in the inner chamber, the inner chamber being a pressurized chamber of the turbomachine comprising oil, or a low-temperature chamber. The term "low-temperature chamber" should be understood to mean an area of the turbomachine needing to be maintained at a low temperature in operation, for example less than 140° C.

If the electric machine is incorporated into a pressurized chamber comprising oil for example, and on initiation of the process for stopping the machine in the event of a short-circuit, by heating the magnets, the supply of hot air increases the temperature, increasing the risk of overheating of the oil in this chamber. The supply of cool air inside it can prevent this overheating of the oil.

In certain embodiments, the cool air injector comprises at least one valve movable between a closed position preventing the injection of cool air into the inner chamber, and an open position allowing the injection of cool air into the inner chamber.

The valve is also connected to the control unit and is used to inject cool air into the inner chamber only if a short-circuit is detected.

In certain embodiments, the electric machine is a permanent-magnet synchronous machine.

This presentation also relates to a turbomachine comprising an assembly as claimed in any of the preceding embodiments.

This presentation also relates to a method for stopping an electric machine for a turbomachine using the assembly as claimed in any of the preceding embodiments, comprising steps of:
- detecting a short-circuit in the electric machine by way of a short-circuit detector,
- injecting onto the magnets of the rotor hot air at a temperature greater than or equal to the demagnetization temperature of the magnets of the rotor of the electric machine, when a short-circuit in the electric machine has been detected in the detecting step
- injecting cool air into an inner chamber of the turbomachine, when a short-circuit in the electric machine has been detected in the detecting step, the temperature of the cool air being less than the temperature of the hot air injected onto the magnets of the rotor.

The injection of cool air can be done simultaneously with the injection of hot air when a short-circuit is detected, or in a slightly deferred manner, for example less than ten seconds after the hot air has begun to be injected.

BRIEF DESCRIPTION OF THE DRAWINGS

The invention and its advantages will be better understood on reading the detailed description given hereinafter of different embodiments given by way of non-limiting example. This description refers to the appended pages of figures, wherein:

FIG. 1 is a longitudinal section view of a turbomachine equipped with a secondary air system, FIG. 2 shows the turbomachine of FIG. 1, equipped with an electrical assembly according to this presentation, FIG. 3 is a detail view of the electric machine of the turbomachine of FIG. 2.

FIG. 4 shows a modified example of the embodiment of FIG. 2.

FIG. 5 shows the different steps of a method for stopping an electric machine according to this presentation.

DESCRIPTION OF THE EMBODIMENTS

The terms "upstream" and "downstream" are defined in the remainder of the text with respect to the direction of flow of the gas through a turbomachine, indicated by the arrow F on FIGS. 1 and 2.

FIG. 1 illustrates a bypass turbomachine 100 comprising, in a known manner from upstream to downstream in succession at least one fan 10, an engine part comprising in succession at least a low-pressure compressor 20, a high-pressure compressor 30, a combustion chamber 40, and at least a high-pressure turbine 50 and a low-pressure turbine 60 stage. The turbomachine 100 is an exemplary embodiment of the invention. The type of turbomachine (architecture and dimensions) is however not limiting in this presentation. The invention may also relate to a turboshaft engine or a turboprop.

Rotors, rotating about the main shaft X of the turbomachine 100 and able to be coupled together by different systems of transmission and gearings, correspond to these different elements.

In a known manner, the turbomachine is equipped with a secondary air system, wherein air is drawn off several different points on the turbomachine 100, more specifically off different stages and off one of the two air paths of the bypass turbomachine, according to the requirements. The air drawn off these points is then routed to another part of the turbomachine 100.

In the example illustrated in FIG. 1, the secondary air system comprises drawing channels 1 and 2, drawing air off the low- or high-pressure compressor 20, 30, and allowing the pressurizing of chambers, a drawing channel 3 in the high-pressure compressor 30 allowing the de-icing of the nose and nacelle, drawing channels 4 and 5 upstream of the combustion chamber 40, used to cool the high-pressure turbine 50. This list is not limiting, the secondary air system being able to include other draw-off points.

FIG. 2 illustrates the turbomachine 100 of FIG. 1, equipped with an electrical assembly according to this presentation. The turbomachine 100 also comprises the different drawing channels described above. These are not shown again in FIG. 2 for the sake of clarity.

The turbomachine 100 is equipped with an electric machine 70, the electric machine 70 being a permanent-magnet synchronous system, disposed in an inner chamber E of the turbomachine. Such an electric machine 70 comprises a rotor 71, comprising the magnets, and a stator 72, comprising copper windings 73. The type of electric machine (material, dimensions, power etc.) and its disposition in the turbomachine, are not limiting in this description. In this example, the inner chamber E is a pressurized chamber upstream of the low-pressure compressor 20.

The stator 72 of the electric machine 70 is attached to a fixed casing 22 of the turbomachine 100. The rotor 71 is secured to a rotating shaft of the turbomachine, for example the low-pressure shaft, by way of a connecting arm 24, for example. The windings 73 located in the stator 72 and the magnets located in the rotor 71 allow the creation of an electrical current when the rotor 71 is rotated. This generated electrical current can in particular be used to supply a power electronics unit located in the turbomachine 100 (not illustrated).

Provision is also made for a device for stopping the electric machine 70 in the turbomachine 100. It comprises a short-circuit detecting means, for example a short-circuit detector 210 and a hot air injecting means, for example a cool air injector 80.

In this example, the short-circuit detector 210 comprises a plurality of thermocouples disposed in the stator 72. Only one is shown in FIGS. 2 and 3. These thermocouples 210 are connected to a computing unit 200, making it possible to read the temperatures measured by the thermocouples 210 in the stator 72. This example is not limiting; other means for detecting short-circuits can be envisioned, such as impedance measuring means, for example a impedance measurer, or leakage current measuring means, for example a leakage current measurer, which can be incorporated into the power electronics unit.

The hot air injecting means 80 comprises one or more ducts 81 (only one of which is shown in FIGS. 2 and 3), each comprising an injecting end 81a and a drawing end 81b. In this example, the drawing end 81b is connected to a downstream stage of the high-pressure compressor 30, in such a way as to be in fluid communication with the latter. A part of the gas flowing along the high-pressure compressor 30 can thus be drawn off and flow through the duct 81. Alternatively, the ducts 81 can also be connected as bypasses of one of the ducts of the secondary air system described previously. More specifically, as a function of the temperature required to demagnetize the magnets, the hot air can be obtained with draws off the different stages of the high-pressure compressor 30, using the secondary air system (SAS) already installed, and/or by adding an additional draw off the same compressor.

The injecting end 81a is disposed near the rotor 71 of the electric machine 70. For example, the injecting end 81a is disposed at a distance of less than 1 cm from the rotor 71. More precisely, the injecting end 81a is disposed so as to be facing the rotor 71, i.e. substantially at one and the same position along a radial direction, perpendicular to the axis X, as the rotor 71. Thus, the gas drawn at the drawing end 81b can be injected directly onto the rotor 71, particularly onto the magnets of the rotor 71. When the hot air injecting means 80 comprises several ducts 81, each drawing end 81b is connected to the high-pressure compressor 30, and each injecting end 81a is disposed near the rotor 71, being for example circumferentially distributed around the axis of rotation of the rotor 71, in such a way as to inject hot air onto the greatest possible surface of the rotor 71.

Furthermore, the hot air injecting means 80 comprises a valve 82, disposed on each duct 81. The valve 82 can be an electrovalve, and is connected to the computing unit 200. The computing unit 200 can control the opening or closing of the valve 82, as a function of the values measured by the short-circuit detector 210. For example, if the thermocouples 210 detect at least one temperature greater than or equal to 300° C., characteristic of the presence of a short-circuit in the electric machine 70, the computing unit 200 controls the opening of the valve 82. The hot air that has been drawn off the high-pressure compressor 30, and present in the duct 81 upstream of the valve 82, can then flow all the way to the injecting end 81a, and thus be injected onto the magnets disposed in the rotor 71. The term "hot air" should be understood to mean that the air drawn off the high-pressure compressor 30 has a temperature greater than the Curie temperature of the magnets of the rotor 71, allowing the demagnetization of these magnets.

According to a modified example of this embodiment illustrated in FIG. 4, the hot air injecting means 80 may comprise ducts 81' connected as bypasses of the ducts 81, comprising a drawing end 81b', each drawing hot air at a different stage of the turbomachine 100. For example, the first drawing end 81b can be connected to the high-pressure compressor 30, upstream of the combustion chamber 40, and the second drawing end 81b' can be connected downstream of the combustion chamber 40. According to this configuration, a second valve 82' is disposed on the bypass duct 81', and is connected to the computing unit 200. The drawing off the two different stages of the turbomachine 100 makes it possible to control the temperature level of the air injected onto the rotor 71. Furthermore, the valves 82 and 82' can be configured to have an adjustable degree of opening, allowing the computing unit 200 to regulate even more precisely the temperature of the air injected onto the rotor 71. It is in particular possible to inject hot air at higher temperatures, making it possible to more efficiently demagnetize certain types of magnet. For example, the magnets of the rotor 71 can be rare earth magnets of Neodymium Iron Boron (NdFeB) type, having a Curie temperature of 370° C. and a maximum operating temperature between 14° and 220° C. The mixing of the air drawn off the high-pressure compressor 30 and downstream of the combustion chamber 40, having a temperature of approximately 500° C., thus allows the demagnetization of these magnets of the rotor 71.

The examples above are non-limiting. In particular, electric machines 70 having different features, particularly magnets comprising different materials, can be used. Thus, according to the electric machine 70 used and its position in the turbomachine 100, the drawing end 81b can be disposed at different stages of the turbomachine 100, for example at different stages of the high-pressure compressor 30.

Furthermore, according to another modified example (not illustrated) of this embodiment, the injecting end 81a can be disposed in the stator 72, and open radially toward the rotor 71. More specifically, the air circuit can be incorporated into the stator 72 of the electric machine 70 through the windings 73, and makes it possible to supply hot air by way of channels to the rotor 71 and to blow this air over the entire surface of the magnets.

Moreover, the turbomachine 100 comprises a cool air injecting means 90 (FIG. 3) comprising ducts 91 which can also be connected as bypasses of one of the ducts of the secondary air system described previously. Such a cool air injecting means 90 is configured to draw the air off a stage of the turbomachine on which the gas has a lower temperature than the air drawn by the hot air injecting means 80, for example the low-pressure compressor 20. The cool air thus drawn can be injected into the pressurized chamber E in which the electric machine 70 is disposed. More specifically, in the event of any short-circuit being detected, the computing unit 200 controls the opening of the valve 82 and/or of the valve 82', and also of a valve 92 disposed on the duct 91 of the cool air injecting means 90. Thus, parallel to the injection of hot air onto the magnets of the rotor 71, allowing the demagnetization of the magnets, the cool air injected into the pressurized chamber E makes it possible to avoid an excessive increase in the oil temperature inside it.

A method for stopping the electric machine for a turbomachine will now be described in the remainder of the description, with reference to FIG. 5.

The short-circuit detector 210, for example the thermocouples, constantly measure the temperature in the machine 70 (step S1). The temperatures read are transmitted to the computing unit 200. The computing unit 200 compares these temperatures with a given threshold temperature, characteristic of a short-circuit (step S2). If, in step S2, the computing unit 200 determines that the temperatures are less than the given temperature threshold, the method returns to step S1.

If, in step S2, the computing unit 200 determines that at least one of the temperatures is greater than or equal to the given temperature threshold, the method goes to step S3. The short-circuit detection therefore comprises the measuring step S1 and the comparing step S2. In the step S3, the computing unit 200 controls the opening of the valve 82 and/or of the valve 82', and of the valve 92 of the cool air injecting means 90 when the machine 70 is disposed in a pressurized chamber E with oil or in a low-temperature chamber, i.e. in an area that must be kept at low temperature. The hot air can thus be injected onto the magnets of the rotor 71, allowing the demagnetization of these magnets, thus limiting the risk of overheating of the oil in this chamber.

Although this invention has been described with reference to specific exemplary embodiments, it is obvious that modifications and changes can be made to these examples without departing from the general scope of the invention as defined by the claims. For example, if the architecture of the turbomachine does not allow for a draw at the correct temperature level before the combustion chamber, the drawn air can be further heated to reach the correct temperature required, using an exchanger incorporated downstream of the combustion chamber (to use the exhaust calories) or by any other overheating method, in particular electrical. Moreover, individual features of the different embodiments illustrated/mentioned can be combined in additional embodiments. Consequently, the description and drawings must be considered in an illustrative sense rather than a restrictive one.

It is also obvious that all the features described with reference to a method are transposable, alone or in combination, to a device, and conversely, all the features described with reference to a device are transposable, alone or in combination, to a method.

The invention claimed is:

1. An electrical assembly for a turbomachine, comprising:
   an electric machine configured to be disposed in the turbomachine, and comprising a stator and a rotor, the rotor being configured to be rotationally secured to a shaft of the turbomachine, and comprising magnets,
   a short-circuit detector configured to detect a presence of a short-circuit in the electric machine,
   a hot air injector configured to draw hot air off the turbomachine at a temperature greater than the temperature of demagnetization of the magnets of the rotor, and to inject the drawn hot air onto the magnets of said rotor when the short-circuit detector detects the presence of a short-circuit in the electric machine, and
   a cool air injector, configured to draw cool air off the turbomachine and to inject it into an inner chamber of the turbomachine when the short-circuit detector detects the presence of a short-circuit in the electric machine, the temperature of the cool air drawn by the cool air injector being less than the temperature of the hot air drawn by the hot air injector, wherein the cool air injector is configured to inject cool air into the inner chamber of the turbomachine in parallel to the injection of hot air onto the magnets of the rotor by the hot air injector.

2. The assembly as claimed in claim 1, wherein the temperature of the hot air drawn by the hot air injector is greater than 250° C.

3. The assembly as claimed in claim 1, wherein the hot air injector is configured to draw hot air off a high-pressure compressor of the turbomachine and/or downstream of a combustion chamber of said turbomachine.

4. The assembly as claimed in claim 1, wherein the short-circuit detector comprises temperature measurer affixed to the machine and/or measuring and impedance comparator and/or leakage current measurer.

5. The assembly as claimed in claim 1, wherein the hot air injector comprises at least one valve movable between a closed position preventing the injection of hot air onto the magnets of the rotor, and an open position allowing the injection of hot air onto the magnets of the rotor.

6. The assembly as claimed in claim 1, comprising a control unit, the short-circuit detector and a valve being connected to the control unit, the control unit being configured to open the valve when the short-circuit detector detects the presence of a short-circuit in the electric machine.

7. The assembly as claimed in claim 1, wherein the electric machine is configured to be disposed in the inner chamber, the inner chamber being a pressurized chamber of the turbomachine comprising oil or a low-temperature chamber.

8. The assembly as claimed in claim 1, wherein the electrical machine is a permanent-magnet synchronous system.

9. A turbomachine comprising an assembly as claimed in claim 1.

10. A method for stopping the electric machine for the turbomachine using the assembly as claimed in claim 1 the method comprising steps of:
    detecting a short-circuit in the electric machine by way of the short-circuit detector,
    injecting onto the magnets of the rotor hot air at the temperature greater than or equal to the demagnetization temperature of the magnets of the rotor of the electric machine, when a short-circuit in the electric machine has been detected in the detecting step,
    injecting cool air into the inner chamber of the turbomachine, when a short-circuit in the electric machine has been detected in the detecting step, the temperature of the cool air being less than the temperature of the hot air injected onto the magnets of the rotor.

11. The assembly as claimed in claim 1, wherein the temperature of the hot air drawn by the hot air injector is greater than 400° C.

12. The assembly as claimed in claim 1, wherein the hot air injector and the cool air injector are configured to inject hot air and cool air respectively onto the magnets and into the inner chamber only if a short-circuit is detected.

13. The assembly as claimed in claim 1, wherein the inner chamber is a pressurized chamber upstream of a low-pressure compressor.

* * * * *